June 8, 1926.
H. D. CHURCH
1,587,579
MOTOR VEHICLE
Filed July 10, 1920
2 Sheets-Sheet 2
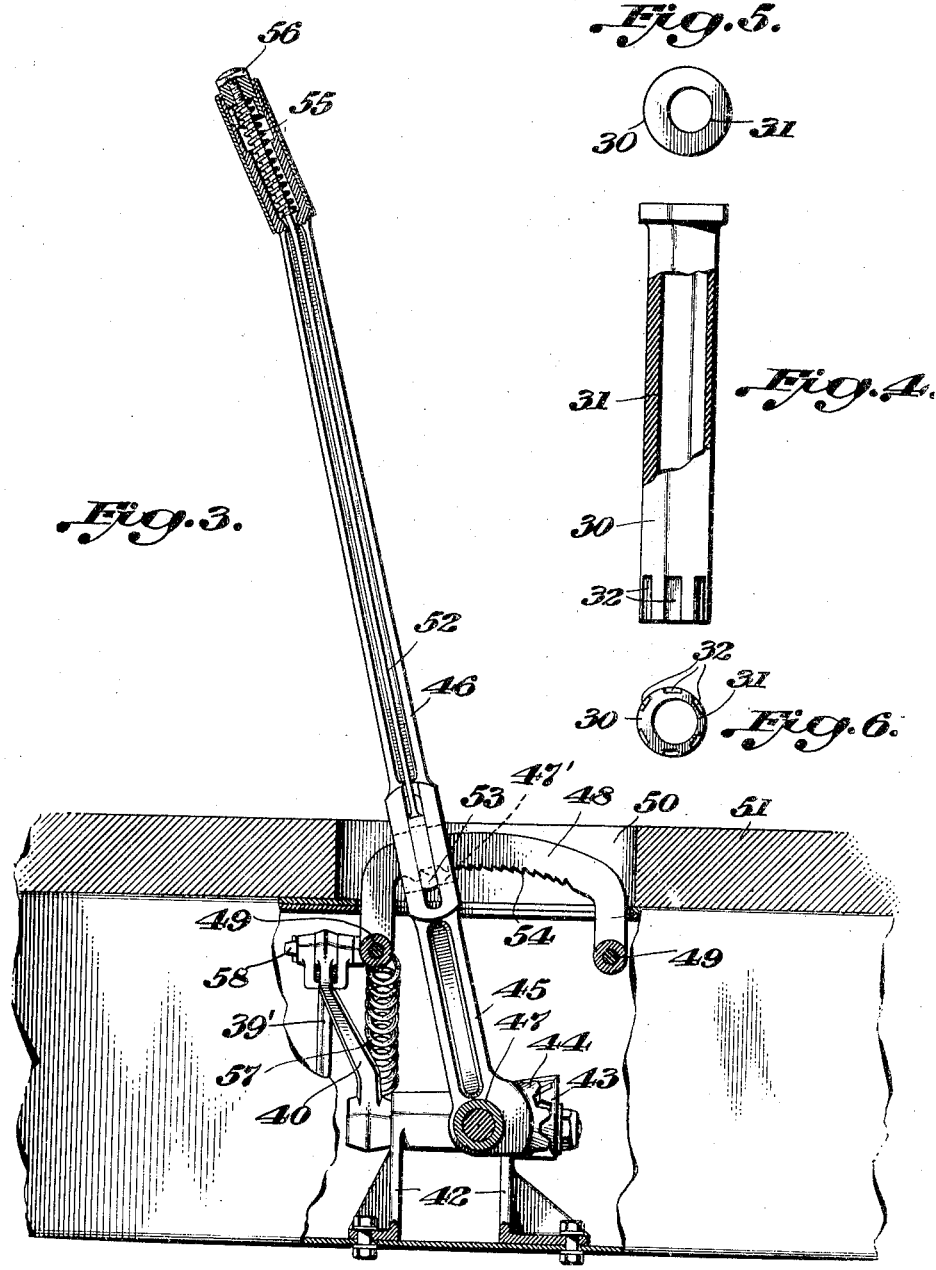
Inventor,
Harold D. Church,
By Milton Sikes
Atty.

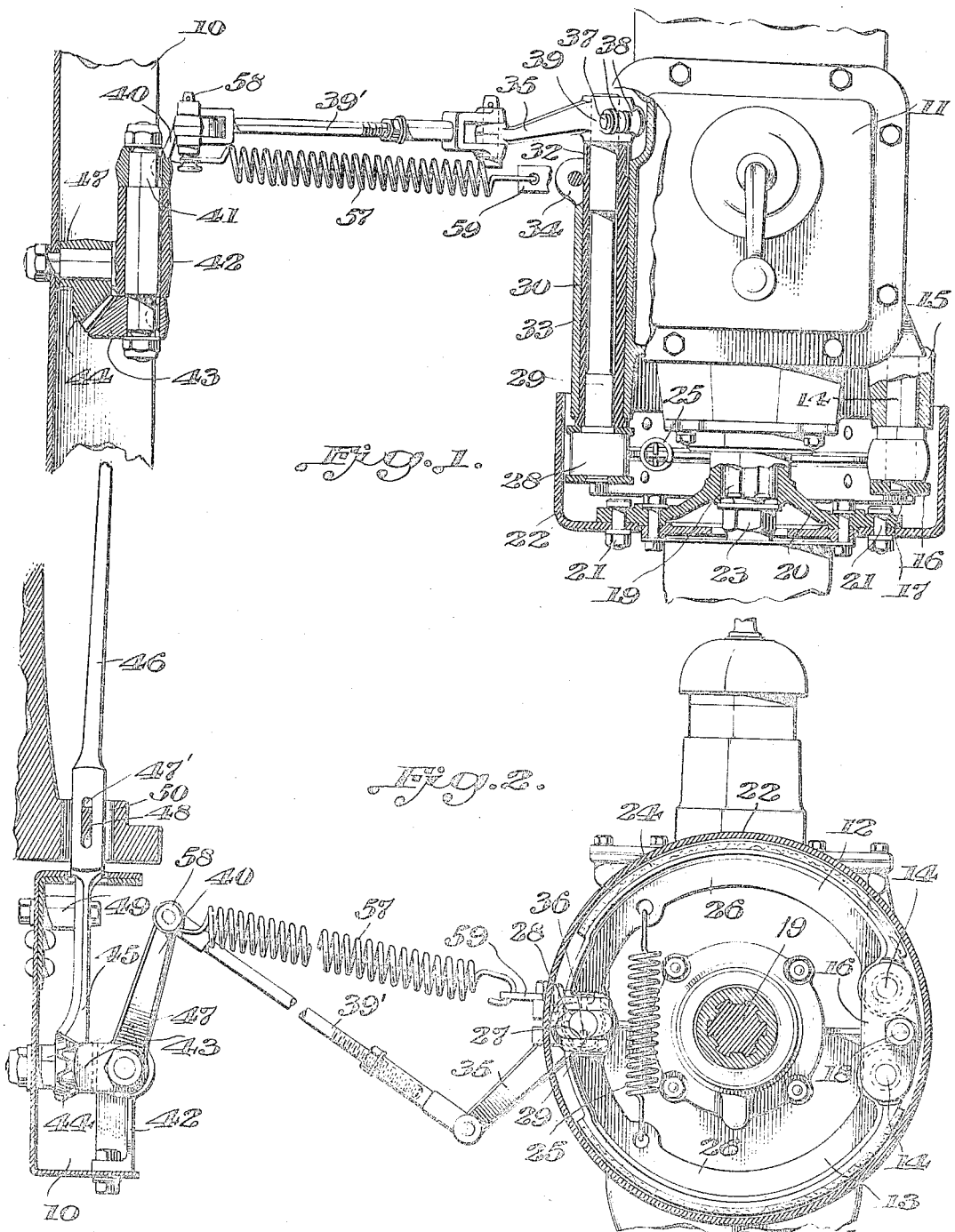

Patented June 8, 1926.

1,587,579

UNITED STATES PATENT OFFICE.

HAROLD D. CHURCH, OF FAIRFIELD, CONNECTICUT, ASSIGNOR TO PACKARD MOTOR CAR COMPANY, OF DETROIT, MICHIGAN, A CORPORATION OF MICHIGAN.

MOTOR VEHICLE.

Application filed July 10, 1920. Serial No. 395,274.

This invention relates to motor vehicles and more particularly to brake mechanism therefor.

In an expanding type of brake wherein a plurality of expansible brake members are adapted to engage a brake drum or a stationary member, it is essential for the efficient operation of the brake that the operating or actuating member operate to the same degree or equally on all of the expansible braking elements. In order that this may be accomplished, it is necessary that the brake shoes, in their positions of rest or initial position, be equally spaced from the stationary brake member or drum.

One of the objects of the invention is to so relatively position the expansible brake members or brake shoes and the actuating means for the shoes that the shoes will be initially equally spaced from the drum and that the actuating means will act equally on all of the brake shoes.

Other objects will appear from the following specification taken in connection with the drawings which form a part of this application, and in which:—

Fig. 1 is a plan view, partly in section, illustrating the brake mechanism and the means for operating this mechanism constructed in accordance with my invention;

Fig. 2 is a sectional view taken at right angles to Fig. 1;

Fig. 3 is an enlarged detail view illustrating the brake operating lever and part of the connections between the lever and the brake mechanism;

Fig. 4 is an elevational view, partly in section, showing the eccentric sleeve in which the cam pivot shaft is mounted; and Figs. 5 and 6 illustrate in elevation the two ends of the sleeves shown in Fig. 4.

In Figs. 1 and 2, I have shown a portion of one of the side frame members 10 of a motor vehicle upon which the brake operating lever is mounted, and a portion of the transmission case 11 upon which the brake mechanism is mounted.

The brake mechanism comprises a pair of brake shoes 12 and 13 mounted upon pivot pins 14, these pins being pivoted in a boss 15 formed on or secured to the transmission case 11. A plate 16 is secured to the outer reduced ends 17 of the pins 14, and this plate is also secured to the boss by means of a screw bolt 18 and thereby retains the pins 14 and also the shoes 12 and 13 in place. A transmission shaft 19 extends through the case 11 and has secured thereto a flanged member 20, to the outer periphery of which is secured, as shown at 21, a brake drum 22. A nut 23 secures the member 20 to the shaft 19, and the member 20 is connected in any suitable manner to the usual universal joint and transmits power through this joint to drive the vehicle.

Each of the brake shoes 12 and 13 is provided with a brake lining 24, and these shoes are normally retracted from the brake drum 22 by means of a spring 25 which is secured at its opposite ends to webs 26 formed on the shoes. Each of the shoes has formed thereon at its end opposite the pivot a flat surface 27 adapted to be engaged by the shoe actuating means, which in this instance comprises a cam 28 mounted on a cam shaft 29.

If a brake of the type described is to operate efficiently, it will be evident that the shoes should, in their initial positions, be accurately centered or equally spaced from the brake drum in order that the actuating means, or in this instance the cam, may act equally on both shoes, thereby obtaining an equal outward pressure by both shoes against the brake drum.

In my improved construction I have provided means for accomplishing this equal spacing of the brake shoes in order to obtain equal pressure by the actuating means, and this is accomplished by means of an eccentric sleeve 30 which is cylindrical on its outer surface, as shown in Figs. 4, 5 and 6, but is provided with an eccentrically disposed bore or opening therethrough, as shown at 31. This opening in the sleeve 30 houses the cam shaft 29, and the sleeve has formed thereon at one end a plurality of depressions or notches 32 in order that the sleeve may be engaged by a wrench or other suitable tool and may be rotated in its casing or bearing 33, the latter being formed on or secured to the transmission case 11. Casing 33 is split at one end, and this split end has formed thereon a pair of outwardly extending lugs or ears 34 by means of which the sleeve 30 may be clamped in any desired position of adjustment.

From the foregoing description it will be seen that the position of the cam shaft 29 with respect to the brake shoes 12 and 13 may be shifted by rotating the eccentric sleeve 30, whereby the shoes may be moved toward or from the brake drum until they are accurately centered with respect to the drum or equally spaced therefrom.

The means for operating the cam shaft comprises an arm 35 keyed to the shaft 29, as shown at 36, and also clamped to the shaft by means of a bolt 37 which engages a pair of ears 38 formed on the sleeve 39 upon which also is formed the arm 35. The free end of the arm 35 is connected by a link 39' to an arm 40, which in turn is secured to one end of a jack shaft 41 rotatably mounted in a bracket 42 carried by one of the frame members 10 of the vehicle. The shaft 41 has secured to its opposite end a segment 43 of a bevel gear, which in turn meshes with a segment 44 of a bevel gear formed integral with the lower end 45 of a brake lever 46, this lever being pivoted, as shown at 47, to the vertical portion of the side member 10.

Any suitable means may be provided for holding a lever in different positions of adjustment, and in the embodiment of the invention illustrated, the lever 46 is shown as provided with a longitudinal slot 47' in which is mounted a toothed segment 48 which is secured, as shown at 49, to the vertical portion of the side member 10, the lever and segment extending downwardly through the upper horizontal portion of the side frame 10 and through an opening 50 formed in the floor 51 of the vehicle. Lever 46 is provided with a longitudinally reciprocable rod 52, which has a pawl 53 at its lower end positioned to engage the teeth 54 of the sector 48 and normally retained in engagement with these teeth by a spring 55 housed in the upper end of the lever and engaging a button 56 secured to the end of the rod 52.

Means is provided for returning the lever to its initial position in which the brake mechanism is inoperative after the release of the pawl 53 from the sector 48, this means comprising a spring 57 secured at one end to the pin 58, which connects the link 39' to the arm 40, and secured at its opposite end to a strap 59 secured to the casing 33 formed on the transmission case 11.

The operation of the brake mechanism may be briefly described as follows: After the brake shoes 12 and 13 have been properly positioned with respect to the brake drum and the actuating means by adjusting the eccentric sleeve 30 and this sleeve has been secured in adjusted position, the brake is operated by swinging the lever 46 on its pivot thereby rotating the jack shaft 41, and through the arms 40 and 35 and link 39' rotating the cam shaft 29 and cam 28. The cam operates in the usual manner swinging the brake shoes about their pivots thereby forcing the brake linings into engagement with the drum.

While I have in the above specification described one specific embodiment of the invention, it will be understood that the objects of the invention may be accomplished by means of other structure, and that modifications and changes in the construction and arrangement of the various cooperating parts may be made without departing from the spirit or scope of the invention as expressed in the following claims.

What I claim and desire to secure by Letters Patent is:—

1. Brake mechanism including a brake drum, a plurality of expansible brake members adapted to engage said drum, actuating means engaging said brake members, means for operating said actuating means, and shiftable means for supporting the actuating means independently of the operating means to adjust the brake members with respect to the drum.

2. Brake mechanism including a brake drum, a plurality of expansible brake members adapted to engage said drum, actuating means engaging said brake member, and means for moving said actuating means bodily, thereby changing the relative positions of said brake members and said drum.

3. Brake mechanism including a brake drum, a plurality of expansible brake members adapted to engage said drum, pivoted actuating means engaging said brake members, and means for adjusting the pivot of said actuating means, thereby changing the relative positions of said members and said drum.

4. Brake mechanism including a brake drum, a plurality of expansible brake members adapted to engage said drum, a cam engaging said brake members for actuating said members, and means for moving said cam bodily, thereby changing the relative positions of said drum and said brake members.

5. Brake mechanism including a brake drum, a pair of brake shoes adapted to engage said brake drum, pivoted means for expanding said brake shoes, and means for adjusting the pivot of said last named means, thereby changing the relative positions of said brake shoes and said drum.

6. Brake mechanism including a brake drum, a pair of pivoted brake shoes adapted to engage said drum, means engaging the free ends of said shoes for expanding said shoes into contact with said drum, and means for bodily adjusting said last named means, thereby changing the relative positions of the free ends of said brake shoes and said drum.

7. Brake mechanism including a frame, a brake drum, a plurality of brake shoes adapted to engage said drum, an eccentric sleeve adjustably carried by said frame, and means journaled in said eccentric sleeve for moving said brake shoes into engagement with said drum.

8. Brake mechanism including a frame, a brake drum, brake shoes adapted to engage said drum, an eccentric sleeve rotatably mounted on said frame, means for clamping said eccentric sleeve in adjusted position, a shaft journaled in said sleeve, and a cam carried by said shaft and engaging said brake shoes.

9. Brake mechanism including a frame, a brake drum, pivoted brake shoes adapted to engage said drum, an eccentric sleeve carried by said frame, means for adjusting said eccentric sleeve upon its axis, a shaft journaled in said sleeve, and a cam carried by said shaft and engaging the free ends of said brake shoes.

10. Brake mechanism including a brake drum, brake shoes adapted to engage said drum, actuating means for said shoes, and means associated with the actuating means for adjusting said shoes with respect to said drum to initially space the shoes simultaneously equal distances from the drum.

11. Brake mechanism including a brake drum, a pair of brake shoes adapted to engage said drum, resilient means for retracting said shoes from said drum, actuating means for said shoes, and means for shifting said actuating means to simultaneously adjust the shoes with respect to said drum.

12. Brake mechanism including a brake drum, a pair of brake shoes adapted to engage said drum, resilient means for retracting said shoes from said drum, actuating means for said shoes, means for operating said actuating means, and means for supporting and shifting said actuating means and adjusting the shoes with respect to said drum without interfering with said operating means.

13. In a motor vehicle, a frame, a transmission case mounted thereon, brake mechanism carried by said transmission case and including expansible brake members, and means carried by said frame for operating said brake mechanism, said means including a lever and gear pivoted to said frame, a jack shaft disposed at right angles to the gear axis, a gear carried by said jack shaft and meshing with said first named gear, and operative connections between said shaft and said brake mechanism.

14. In a motor vehicle, a frame, brake mechanism carried thereby, and means for operating said brake mechanism including a lever pivoted to said frame and having a segmental gear formed thereon, a jack shaft disposed substantially at right angles to the pivot of said lever and having a gear meshing with the segmental gear, and operative connections between said jack shaft and said brake mechanism.

15. In a motor vehicle, a frame, brake mechanism carried thereby and including a pair of brake shoes, a cam for actuating said brake shoes, and means for rotating said cam including a lever pivoted to said vehicle frame, a gear carried by said lever, a jack shaft mounted on said frame and disposed substantially at right angles to the pivot of said lever, and operative connections between said jack shaft and said cam.

16. Brake mechanism including a drum, a pair of brake shoes adapted to engage said drum, and means for simultaneously moving one of said shoes toward the drum and the other shoe away from said drum.

17. Brake mechanism including a drum, a pair of pivoted brake shoes adapted to engage said drum, and means operable on the free ends of said shoes for causing the free ends of both shoes to move simultaneously in the same direction.

In testimony whereof I affix my signature.

HAROLD D. CHURCH.